(12) United States Patent
Tanaka et al.

(10) Patent No.: US 11,840,822 B2
(45) Date of Patent: Dec. 12, 2023

(54) WORK MACHINE

(71) Applicant: HITACHI CONSTRUCTION MACHINERY CO., LTD., Tokyo (JP)

(72) Inventors: Hiroaki Tanaka, Kasumigaura (JP); Hisami Nakano, Tsuchiura (JP); Yuusuke Suzuki, Tsuchiura (JP); Hiroshi Sakamoto, Hitachi (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 604 days.

(21) Appl. No.: 16/981,516

(22) PCT Filed: Jun. 13, 2019

(86) PCT No.: PCT/JP2019/023406
§ 371 (c)(1),
(2) Date: Sep. 16, 2020

(87) PCT Pub. No.: WO2020/054160
PCT Pub. Date: Mar. 19, 2020

(65) Prior Publication Data
US 2021/0010226 A1 Jan. 14, 2021

(30) Foreign Application Priority Data
Sep. 13, 2018 (JP) .................. 2018-171931

(51) Int. Cl.
*E02F 3/43* (2006.01)
*E02F 9/26* (2006.01)
*E02F 9/20* (2006.01)

(52) U.S. Cl.
CPC .............. *E02F 3/435* (2013.01); *E02F 9/26* (2013.01); *B60Y 2200/412* (2013.01); *E02F 9/2004* (2013.01); *E02F 9/2025* (2013.01)

(58) Field of Classification Search
CPC ....... E02F 3/435; E02F 9/2004; E02F 9/2025; E02F 9/2033; E02F 9/2203; E02F 9/26; E02F 9/261; E02F 9/265; B60Y 2200/412
See application file for complete search history.

(56) References Cited

U.S. PATENT DOCUMENTS 9,194,106 B2    11/2015  Matsuyama
11,105,066 B2 *  8/2021  Chiba .................. E02F 9/2228
(Continued)

FOREIGN PATENT DOCUMENTS

JP  11-350537 A  12/1999
JP  5548306 B2   7/2014
(Continued)

OTHER PUBLICATIONS

International Search Report of PCT/JP2019/023406 dated Jul. 16, 2019.
(Continued)

*Primary Examiner* — Tyler J Lee
(74) *Attorney, Agent, or Firm* — MATTINGLY & MALUR, PC

(57) ABSTRACT

A work machine capable of assisting in an operator's operation to allow a work tool move along a design surface indicating a target shape of an object to be worked irrespectively of an angle of the design surface and a posture of a work implement is provided. A controller determines an excavation actuator in charge of an excavation action and determines an alignment actuator in charge of an alignment action for a work tool out of a plurality of actuators on the basis of the design surface set by a work execution target setting device and the posture of the work implement measured by a work implement posture/position measurement device, determines a target velocity of the excavation actuator on the basis of operation signals outputted from an operation device, and limits a target velocity of the align-
(Continued)

ment actuator in a direction in which the work tool approaches the design surface.

4 Claims, 11 Drawing Sheets

(56) References Cited

U.S. PATENT DOCUMENTS

| | | |
|---|---|---|
| 11,384,509 B2 * | 7/2022 | Nakano ................. E02F 9/2271 |
| 2016/0040398 A1 | 2/2016 | Kitajima et al. |
| 2016/0097184 A1 | 4/2016 | Matsuyama et al. |
| 2020/0232186 A1 * | 7/2020 | Nakano ................. E02F 9/2296 |
| 2020/0277751 A1 * | 9/2020 | Chiba ....................... E02F 3/32 |

FOREIGN PATENT DOCUMENTS

| | | |
|---|---|---|
| WO | 2014/167718 A1 | 10/2014 |
| WO | 2015/137528 A1 | 9/2015 |

OTHER PUBLICATIONS

International Preliminary Report on Patentability received in corresponding International Application No. PCT/JP2019/023406 dated Mar. 25, 2021.

* cited by examiner

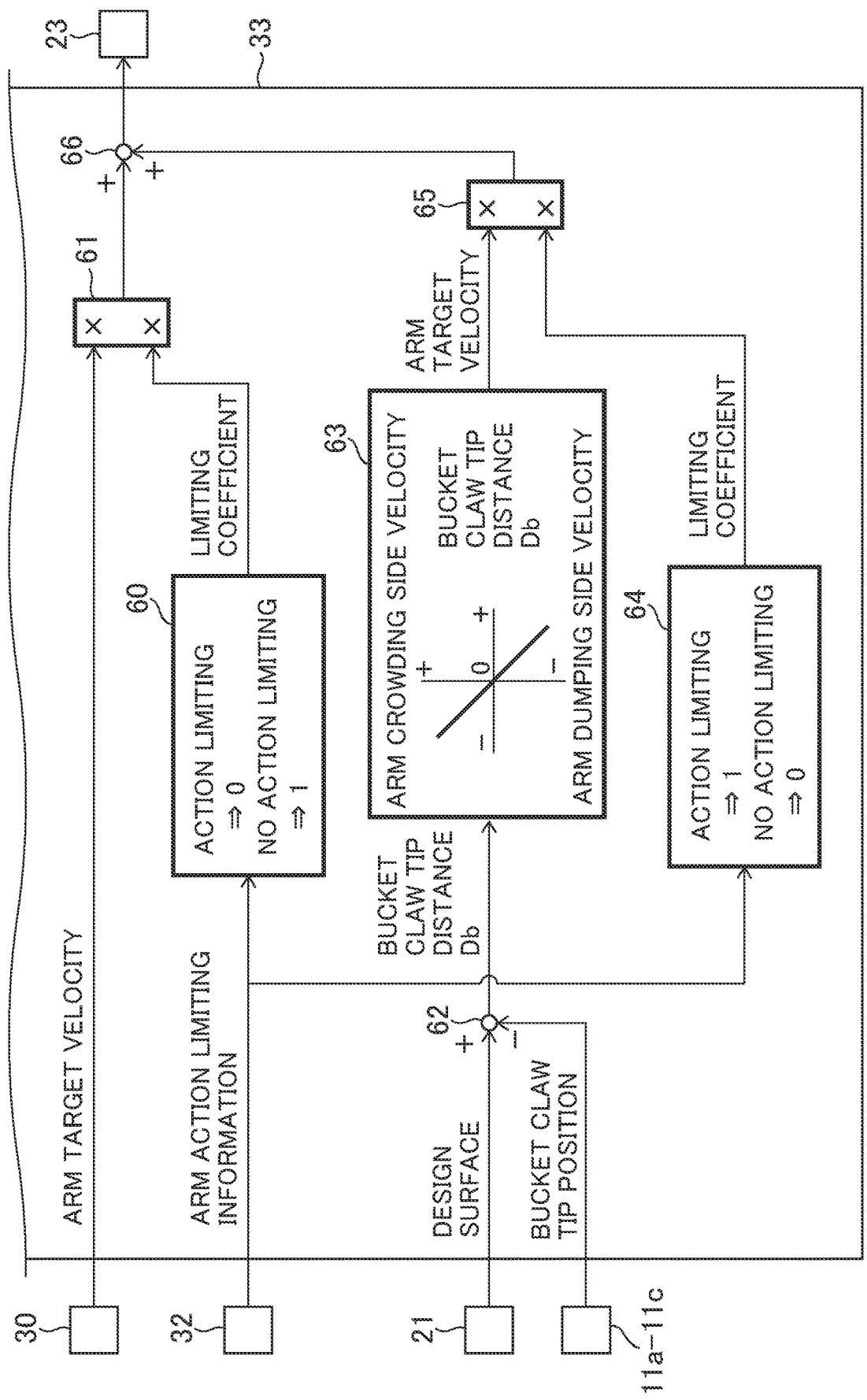

FIG. 7A

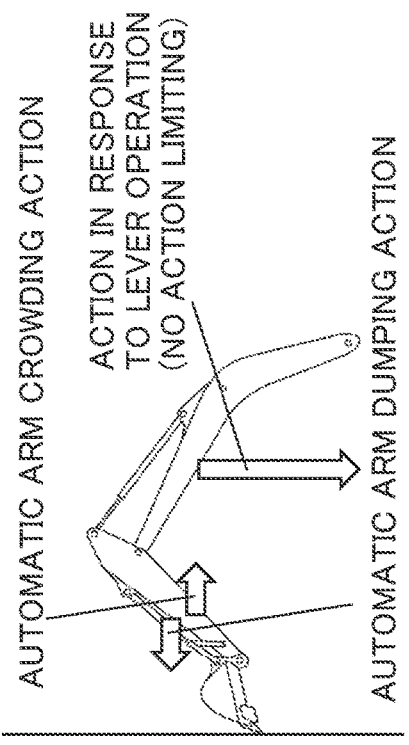

AUTOMATIC BOOM RAISING ACTION

ACTION IN RESPONSE TO LEVER OPERATION (NO ACTION LIMITING)

ARM IN CHARGE OF EXCAVATION
ARM OPERATION IS NOT PERFORMED
BOOM OPERATION IS PERFORMED

FIG. 7C

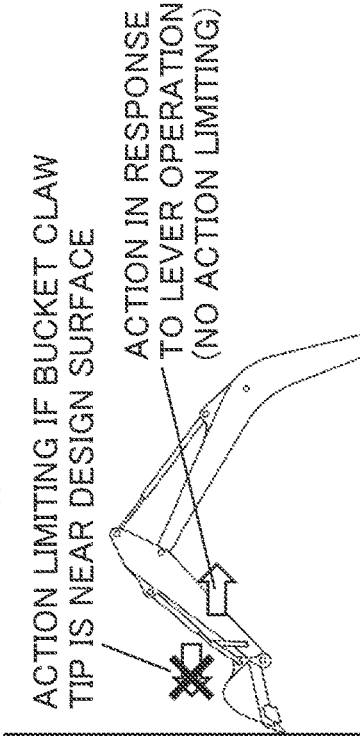

AUTOMATIC ARM CROWDING ACTION

ACTION IN RESPONSE TO LEVER OPERATION (NO ACTION LIMITING)

AUTOMATIC ARM DUMPING ACTION

BOOM IN CHARGE OF EXCAVATION
ARM OPERATION IS NOT PERFORMED
BOOM OPERATION IS PERFORMED

FIG. 7B

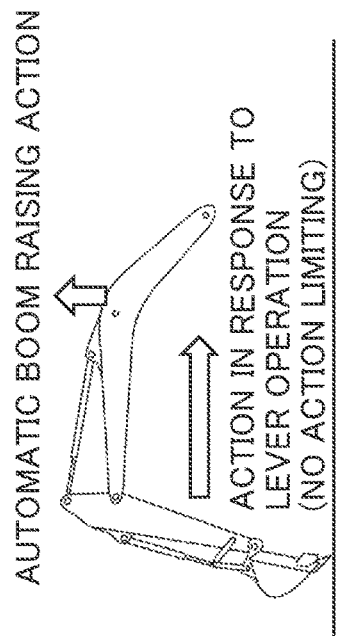

ACTION IN RESPONSE TO LEVER OPERATION (NO ACTION LIMITING)

ACTION LIMITING IF BUCKET CLAW TIP IS NEAR DESIGN SURFACE

ARM IN CHARGE OF EXCAVATION
ARM OPERATION IS NOT PERFORMED
BOOM OPERATION IS PERFORMED

FIG. 7D

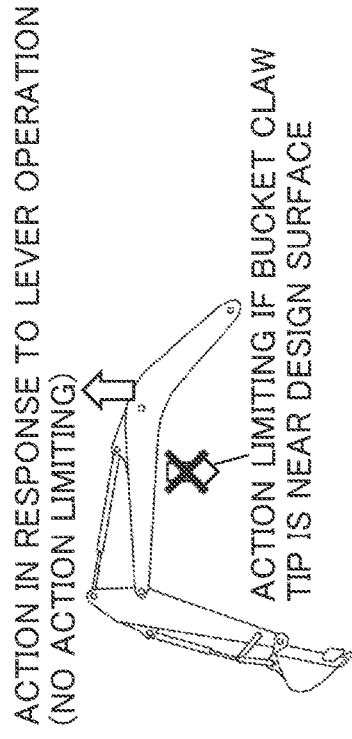

ACTION LIMITING IF BUCKET CLAW TIP IS NEAR DESIGN SURFACE

ACTION IN RESPONSE TO LEVER OPERATION (NO ACTION LIMITING)

BOOM IN CHARGE OF EXCAVATION
ARM OPERATION IS PERFORMED
BOOM OPERATION IS NOT PERFORMED

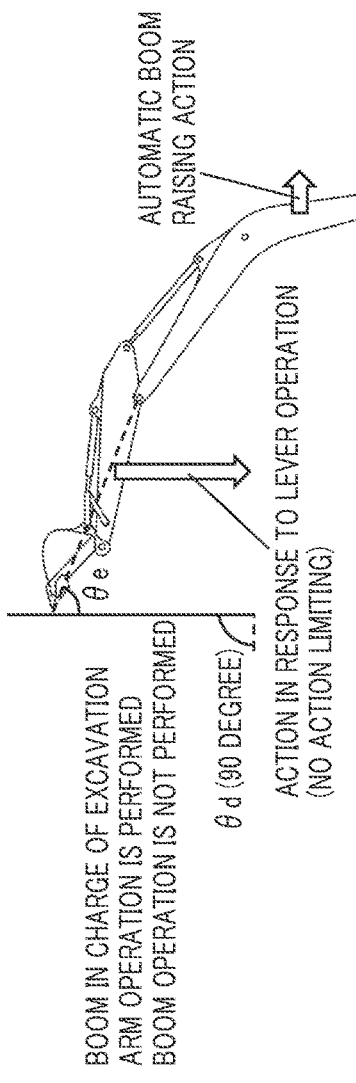
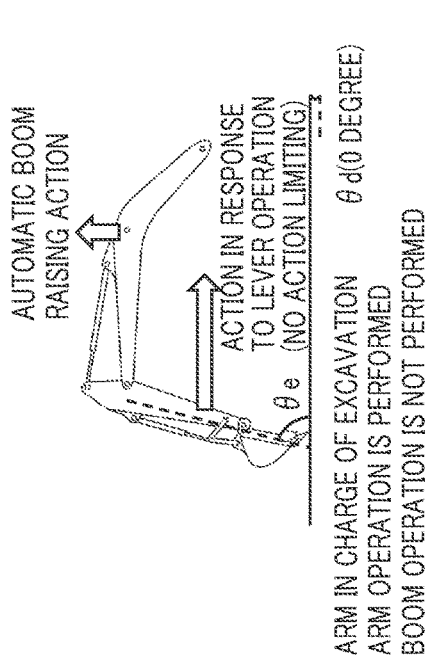
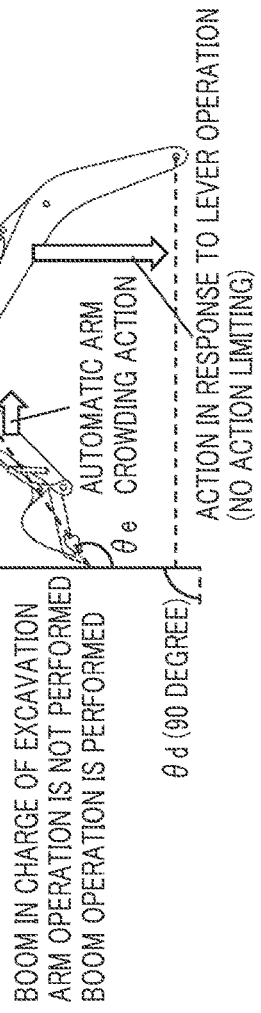
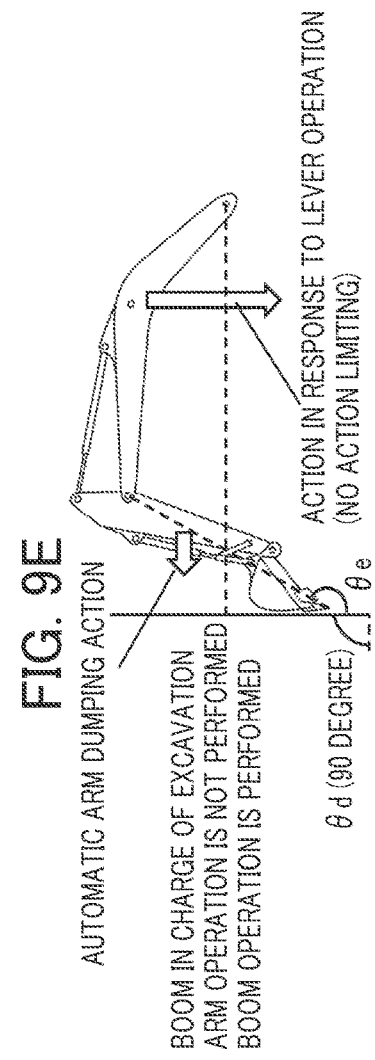

WORK MACHINE

TECHNICAL FIELD

The present invention relates to a work machine such as a hydraulic excavator.

BACKGROUND ART

As a hydraulic system mounted in a work machine such as a conventional hydraulic excavator, there is known a hydraulic system configured with a prime mover such as an engine, a hydraulic pump driven by the prime mover, actuators driven by a pressurized fluid delivered from the hydraulic pump, and directional control valves controlling directions and flow rates of the pressurized fluid supplied from the hydraulic pump to the actuators. Action directions and action velocities of the actuators are determined by operator's operating an operation device such as operation levers provided in the work machine.

Patent Document 1, for example, discloses a hydraulic excavator (semiautomatic excavator) having onboard semiautomatic control capable of assisting in an operator's operation in work for excavating a ground agreeably to a design surface that indicates a target shape of an object to be worked.

A work implement control system including: a work implement having a boom swingably attached to a machine main body, an arm swingably attached to the boom, and a bucket swingably attached to the arm; an operation tool that receives a user's operation for driving the work implement and that outputs operation signals in response to the user's operation; a work type determination section that determines that a work type of the work implement is shaping work in a case in which the operation signals contain at least an arm operation signal for operating the arm, and that determines that the work type is cutting edge alignment work in a case in which the operation signals do not contain the arm operation signal; and a drive control section that controls the bucket to move along a design surface indicating a target shape of an object to be excavated in a case in which the work type is determined to be the shaping work, and that controls the bucket to stop at a predetermined position with reference to the design surface in a case in which the work type is determined to be the cutting edge alignment work, is described in Patent Document 1.

PRIOR ART DOCUMENT

Patent Document

Patent Document 1: Japanese Patent No. 5548306

SUMMARY OF THE INVENTION

Problems to be Solved by the Invention

Meanwhile, in a case of conducting excavation work using a hydraulic excavator that is not a semiautomatic excavator, an operator operates an arm and a boom so that a bucket claw tip moves along a design surface in consideration of an angle of the design surface and a posture of a work implement.

For example, in a case in which the design surface is a horizontal surface, a distance between the bucket claw tip and the design surface is adjusted by operating the boom in a boom raising direction while conducting excavation by operating the arm in an arm crowding direction. On the other hand, in a case in which the design surface is a vertical surface, which the operator operates, the arm or the boom, to conduct excavation varies depending on an angle (excavation angle) of the arm with respect to the design surface. Specifically, the distance between the bucket claw tip and the design surface is adjusted by operating the boom in the boom raising direction while conducting excavation by operating the arm in the arm crowding direction at an excavation angle equal to or smaller than 90 degrees, and the distance between the bucket claw tip and the design surface is adjusted by operating the arm in an arm dumping direction while conducting excavation by operating the boom in a boom lowering direction at an excavation angle greater than 90 degrees. In this way, which the operator operates, the arm or the boom, to conduct excavation varies depending on the angle of the design surface and the posture of the work implement.

However, in the semiautomatic excavator described in Patent Document 1, the work type of the work implement is determined to be the shaping work in the case in which the operation signals contain at least the arm operation signal for operating the arm, and the work type is determined to be the cutting edge alignment work in the case in which the operation signals do not contain the arm operation signal; thus, even with operator's operating the boom in the boom lowering direction to excavate the vertical design surface, the work type is not determined to be the shaping work. As a result, it is impossible to assist in an operator's operation to allow the bucket to move along the vertical design surface.

The present invention has been achieved in light of the problems, and an object of the present invention is to provide a work machine capable of assisting in an operator's operation to allow a work tool to move along a design surface that indicates a target shape of an object to be worked irrespectively of an angle of the design surface and a posture of a work implement.

Means for Solving the Problems

To attain the object, the present invention provides a work machine including: a multijoint work implement that has a work tool and a plurality of work members; a plurality of actuators that drive the work implement; an operation device for operating the work implement; a controller that controls the work implement to be actuated in response to operation signals outputted from the operation device; a work execution target setting device for setting a design surface indicating a target shape of an object to be worked; and a work implement posture/position measurement device that measures a posture of the work implement and a position of the work tool, the controller determining target velocities of the plurality of actuators on the basis of the operation signals outputted from the operation device, and correcting the target velocities on the basis of the design surface set by the work execution target setting device and the position of the work tool measured by the work implement posture/position measurement device, wherein the controller determines an excavation actuator in charge of an excavation action and an alignment actuator in charge of an alignment action for the work tool out of the plurality of actuators on the basis of the design surface set by the work execution target setting device and the posture of the work implement measured by the work implement posture/position measurement device, determines a target velocity of the excavation actuator on the basis of the operation signals outputted from the operation device, and limits a target velocity of the alignment actuator in a direction in which the work tool approaches the design surface.

According to the present invention configured as described above, the excavation actuator in charge of the excavation action and the alignment actuator in charge of the work implement alignment action are determined out of the plurality of actuators on the basis of the design surface indicating the target shape of the object to be worked and the posture of the work implement, the target velocity of the excavation actuator is determined on the basis of the operation signals outputted from the operation device, and the target velocity of the alignment actuator is limited in the direction in which the work implement approaches the design surface. It is thereby possible to assist in an operator's operation to allow the work implement to move along the design surface irrespectively of the angle of the design surface and the posture of the work implement.

Advantages of the Invention

The work machine according to the present invention can assist in the operator's operation so that the work tool moves along the design surface indicating the target shape of the object to be worked irrespectively of the angle of the design surface and the posture of the work implement.

BRIEF DESCRIPTION OF THE DRAWINGS

FIG. 6 is a diagram depicting computing logic, which is associated with an action of an arm cylinder, of the semiautomatic control section depicted in FIG. 2.

FIG. 7 is a diagram depicting actions of a front work implement realized by the controller depicted in FIG. 2.

FIG. 9 is a diagram depicting actions of a front work implement realized by a controller according to Embodiment 2 of the present invention.

MODES FOR CARRYING OUT THE INVENTION

Figure 1:
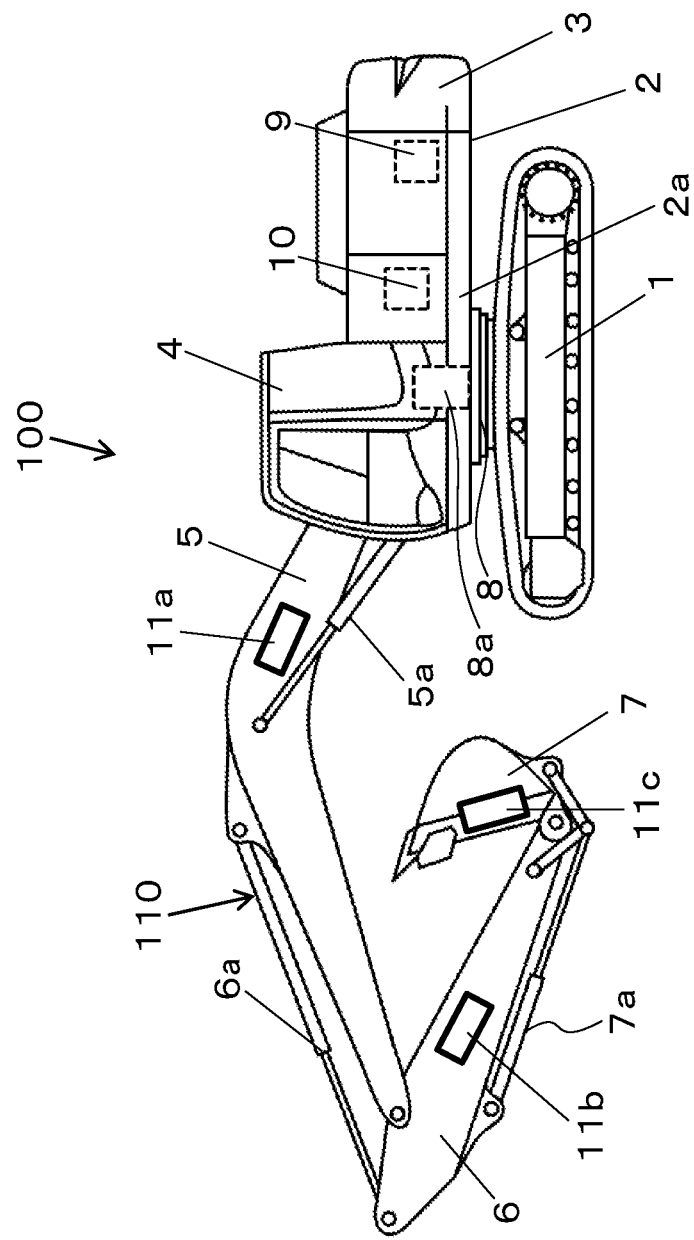
FIG. 1 is a side view of a hydraulic excavator according to Embodiment 1 of the present invention.

A hydraulic excavator will be described hereinafter as an example of a work machine according to embodiments of the present invention with reference to the drawings. It is noted that equivalent members are denoted by same reference characters in the drawings and repetitive description will be omitted.

Embodiment 1

FIG. 1 is a side view of a hydraulic excavator according to Embodiment 1 of the present invention.

As depicted in FIG. 1, a hydraulic excavator 100 is configured with a travel structure 1, a swing structure 2 swingably mounted on the travel structure 1 via a swing device 8, and a front work implement 110 vertically rotatably coupled to a front side of this swing structure 2.

The swing structure 2 has a swing frame 2a that forms a foundation lower structure. The front work implement 110 is vertically rotatably coupled to a front side of the swing frame 2a. A counterweight 3 that keeps weight balance between the swing structure 2 and the front work implement 110 is attached to a rear side of the swing frame 2a. A cabin 4 is provided in a front portion on a left side of the swing frame 2a. In the cabin 4, left and right operation lever devices 15L and 15R (depicted in FIG. 2) serving as an operation device for operating the front work implement 110 and the swing structure 2, and the like are disposed. On the swing frame 2a, an engine (not depicted) serving as a prime mover, a pump device 9 formed from one or a plurality of hydraulic pumps driven by the engine, a swing motor 8a that drives the swing device 8, a control valve unit 10 formed from a plurality of directional control valves that control flows of a pressurized fluid supplied from the pump device 9 to a plurality of hydraulic actuators including a boom cylinder 5a, an arm cylinder 6a, and a bucket cylinder 7a to be described later, and the like are mounted.

The front work implement 110 is configured with a boom 5 having a base end portion vertically rotatably coupled to a front portion on a right side of the swing frame 2a, an arm 6 vertically and longitudinally rotatably coupled to a tip end portion of this boom 5 and raised and lowered by the boom 5, a bucket 7 vertically and longitudinally rotatably coupled to a tip end portion of this arm 6 and serving as a work tool raised and lowered by the boom 5 or the arm 6, the boom cylinder 5a that drives the boom 5, the arm cylinder 6a that drives the arm 6, and the bucket cylinder 7a that drives the bucket 7. Angle sensors 11a, 11b, and 11c are attached to the boom 5, the arm, and the bucket 7, respectively. The angle sensors 11a to 11c configure a posture/position measurement device that measures a posture of the front work implement 110 and a claw tip position of the bucket 7.

Figure 2:
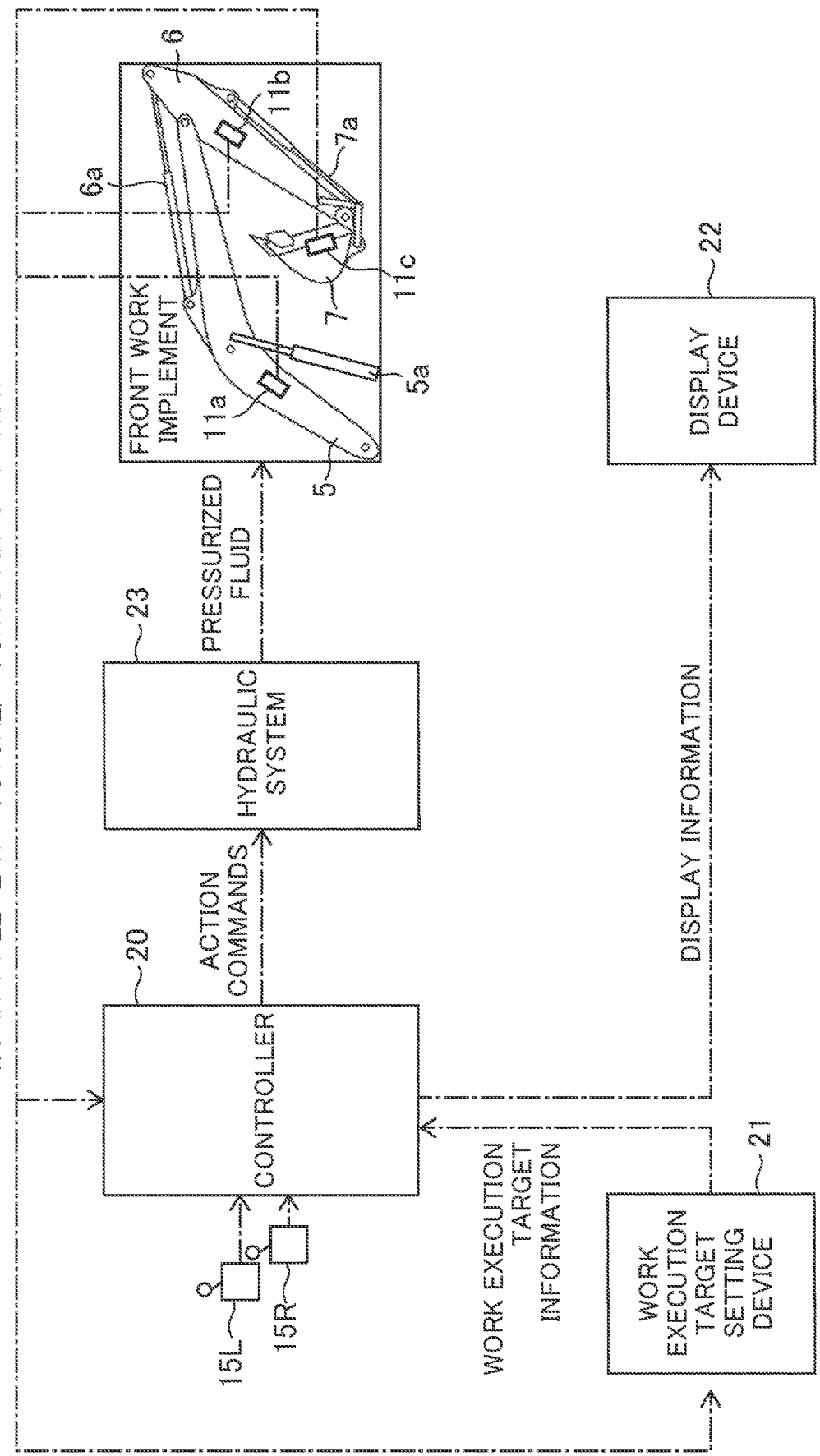
FIG. 2 is a schematic configuration diagram of a hydraulic control system mounted in the hydraulic excavator depicted in FIG. 1.

FIG. 2 is a schematic configuration diagram of a hydraulic control system mounted in the hydraulic excavator 100.

As depicted in FIG. 2, a hydraulic control system 200 is configured with a controller 20, a work execution target setting device 21 for setting a design surface that indicates a target shape of an object to be worked, a display device 22 that displays information outputted from the controller 20, the left and right operation lever devices 15L and 15R for instructing the controller 20 to control an action of the hydraulic system control system, the work implement posture/position measurement device 11a to 11c, and a hydraulic system 23.

The left and right operation lever devices 15L and 15R each output an operation signal in response to an operator's lever operation.

The controller 20 generates action commands given to the actuators 5a, 6a, 7a, and 8a and outputs the action commands to the hydraulic system 23 on the basis of the operation signals input from the left and right operation lever devices 15L and 15R, design surface information input from the work execution target setting device 21, and work implement posture/position information input from the work implement posture/position measurement device 11a to 11c.

The hydraulic system 23 supplies a pressurized fluid to the boom cylinder 5a, the arm cylinder 6a, the bucket cylinder 7a, and the swing motor 8a in response to the action commands from the controller 20, and drives the boom 5, the arm 6, the bucket 7, and the swing device 8.

Figure 3:
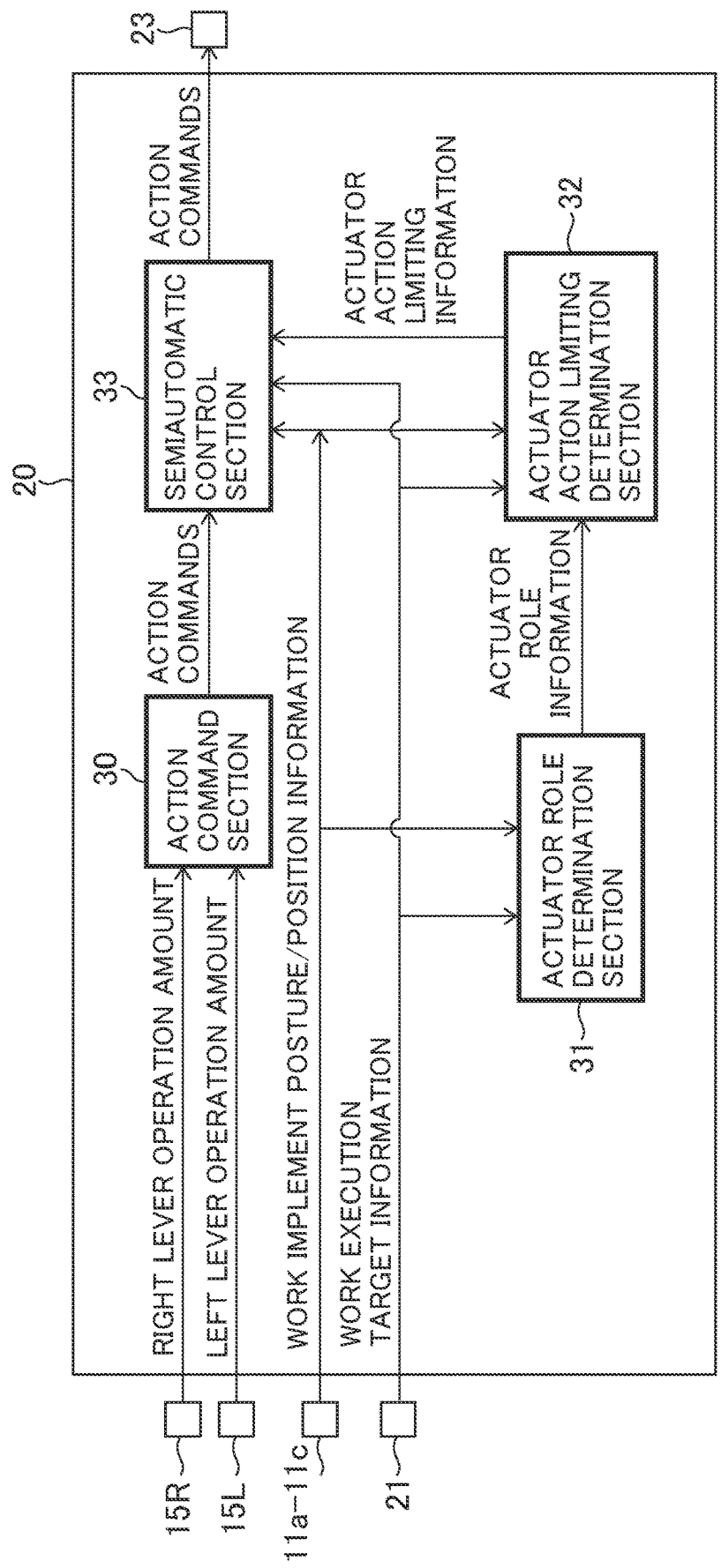
FIG. 3 is a functional block diagram of a controller depicted in FIG. 2.

FIG. 3 is a functional block diagram of the controller 20.

As depicted in FIG. 3, the controller 20 has an action command section 30, an actuator role determination section 31, an actuator action limiting determination section 32, and a semiautomatic control section 33.

The action command section 30 determines target action velocities of the actuators 5a, 6a, and 7a on the basis of the operation signals (left and right lever operation amounts) input from the left and right operation lever devices 15L and 15R, and outputs the action commands corresponding to the target velocities to the semiautomatic control section 33.

The work implement posture/position information is input to the actuator role determination section 31 from the work implement posture/position measurement device 11a to 11c, and work execution target information is input thereto from the work execution target setting device 21. The actuator role determination section 31 determines the actuator (excavation actuator) in charge of excavation and the actuator (alignment actuator) in charge of alignment on the basis of the work implement posture/position information and the work execution target information, and outputs a result of determination to the actuator action limiting determination section 32 as actuator role information.

The work implement posture/position information is input to the actuator action limiting determination section 32 from the work implement posture/position measurement device 11a to 11c, the work execution target information is input thereto from the work execution target setting device 21, and the actuator role information is input thereto from the actuator role determination section 31. The actuator action limiting determination section 32 determines whether to limit an action of each actuator on the basis of the work implement posture/position information, the work execution target information, and the actuator role information, and outputs a result of determination to the semiautomatic control section 33 as action limiting information.

The action commands are input to the semiautomatic control section 33 from the action command section 30, the work implement posture/position information is input thereto from the work implement posture/position measurement device 11a to 11c, the work execution target information is input thereto from the work execution target setting device 21, and the action limiting information is input thereto from the actuator action limiting determination section 32. The semiautomatic control section 33 corrects the action commands on the basis of the work implement posture/position information, the work execution target information, and the action limiting information in such a manner as to impose stricter limitations on the target velocities of the actuators as a deviation between the target surface contained in the work execution target information and a bucket claw tip position is smaller to prevent excessive excavation by the bucket 7, and outputs the corrected action commands.

Figure 4:
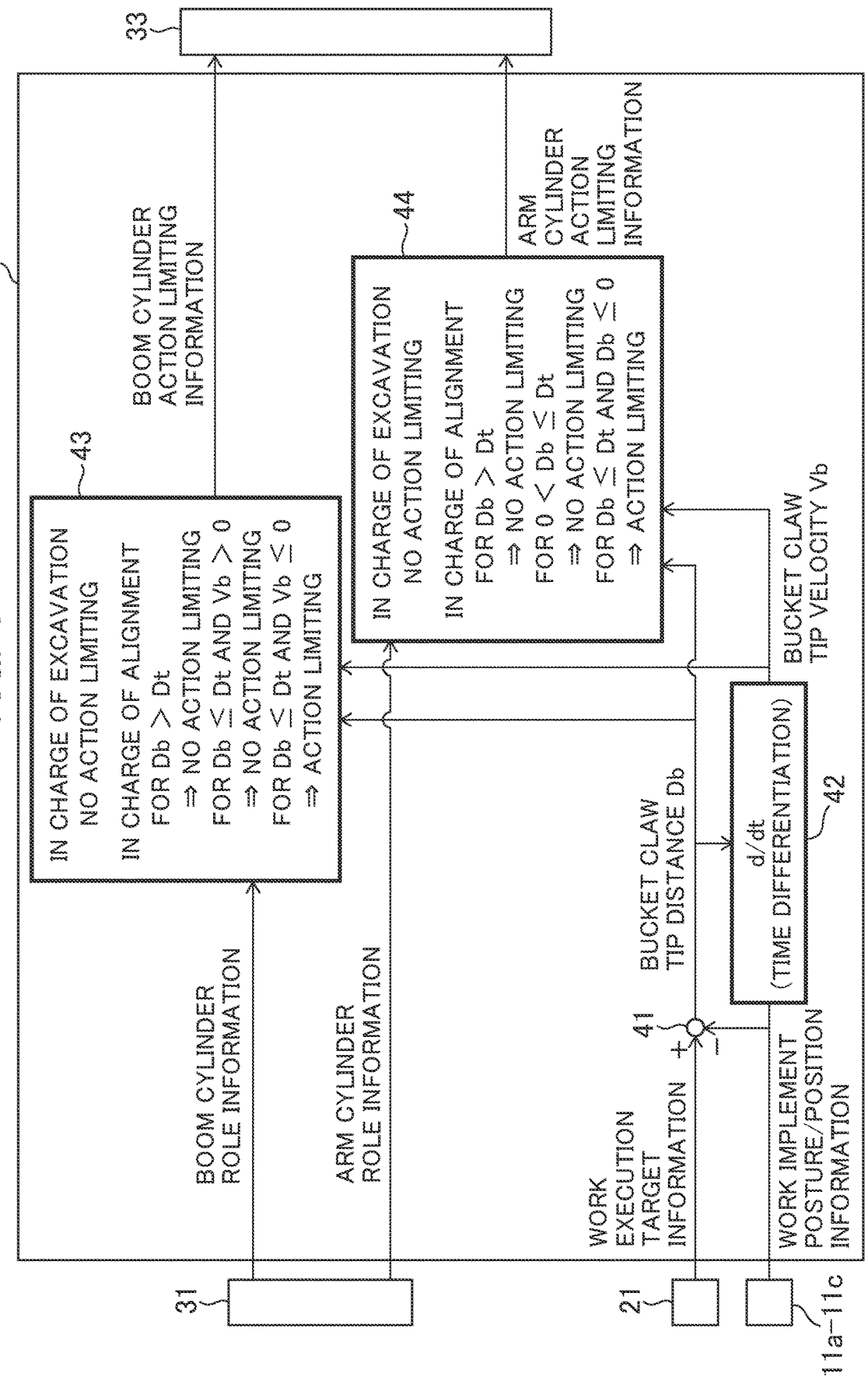
FIG. 4 is a diagram depicting computing logic of an actuator action limiting determination section depicted in FIG. 2.

FIG. 4 is a diagram depicting computing logic of the actuator action limiting determination section 32.

As depicted in FIG. 4, the actuator action limiting determination section 32 has a deviation computing section 41, a time differentiation section 42, a boom action limiting determination section 43, and an arm action limiting determination section 44.

The work execution target information is input to the deviation computing section 41 from the work execution target setting device 21, and the work implement posture/position information is input thereto from the work implement posture/position measurement device 11a to 11c. The deviation computing section 41 computes a bucket claw tip distance Db that is a deviation between the design surface contained in the work execution target information and the bucket claw tip position contained in the work implement posture/position information, and outputs the bucket claw tip distance Db to the time differentiation section 42, the boom action limiting determination section 43, and the arm action limiting determination section 44.

The time differentiation section 42 time-differentiates the bucket claw tip distance Db input from the deviation computing section 41, and outputs a result of time differentiation to the boom action limiting determination section 43 and the arm action limiting determination section 44 as a bucket claw tip velocity Vb.

Boom cylinder role information is input to the boom action limiting determination section 43 from the actuator role determination section 31, the bucket claw tip distance Db is input thereto from the deviation computing section 41, and the bucket claw tip velocity Vb is input thereto from the time differentiation section 42. The boom action limiting determination section 43 determines whether to limit an action of the boom cylinder 5a on the basis of the boom cylinder role information, the bucket claw tip distance Db, and the bucket claw tip velocity Vb, and outputs a result of determination to the semiautomatic control section 33. Specifically, the boom action limiting determination section 43 determines not to limit the action of the boom cylinder 5a in a case in which the boom cylinder 5a is the excavation actuator, in a case in which the boom cylinder 5a is the alignment actuator and the bucket claw tip distance Db is larger than a predetermined distance threshold Dt (the bucket claw tip is far away from the design surface), or in a case in which the boom cylinder 5a is the alignment actuator, the bucket claw tip distance Db is equal to or smaller than the predetermined distance threshold Dt (the bucket claw tip is located near or below the design surface), and the bucket claw tip velocity Vb is a positive value (the bucket claw tip moves in a direction away from the design surface), and determines to limit the action of the boom cylinder 5a in a case in which the boom cylinder 5a is the alignment actuator, the bucket claw tip distance Db is equal to or smaller than the predetermined distance threshold Dt (the bucket claw tip is located near or below the design surface), and the bucket claw tip velocity Vb is a value equal to or lower than zero (the bucket claw tip moves in a direction of approaching the design surface).

Arm role information is input to the arm action limitation determination section 44 from the actuator role determination section 31, the bucket claw tip distance Db is input thereto from the deviation computing section 41, and the bucket claw tip velocity Vb is input thereto from the time differentiation section 42. The arm action limitation determination section 44 determines whether to limit an action of the arm cylinder 6a on the basis of the arm cylinder role information, the bucket claw tip distance Db, and the bucket claw tip velocity Vb, and outputs a result of determination to the semiautomatic control section 33. Specifically, the arm action limitation determination section 44 determines not to limit the action of the arm cylinder 6a in a case in which the arm cylinder 6a is the excavation actuator, in a case in which the arm cylinder 6a is the alignment actuator and the bucket claw tip distance Db is larger than the predetermined distance threshold Dt (the bucket claw tip is far away from the design surface), or in a case in which the arm cylinder 6a is the alignment actuator, the bucket claw tip distance Db is equal to or smaller than the predetermined distance threshold Dt (the bucket claw tip is located near or below the design surface), and the bucket claw tip velocity Vb is the positive value (the bucket claw tip moves in the direction away from the design surface), and determines to limit the action of the arm cylinder 6a in a case in which the arm cylinder 6a is the alignment actuator, the bucket claw tip distance Db is equal to or smaller than the predetermined distance threshold Dt (the bucket claw tip is located near or below the design surface), and the bucket claw tip velocity Vb is the value equal to or lower than zero (the bucket claw tip moves in the direction of approaching the design surface).

Figure 5:
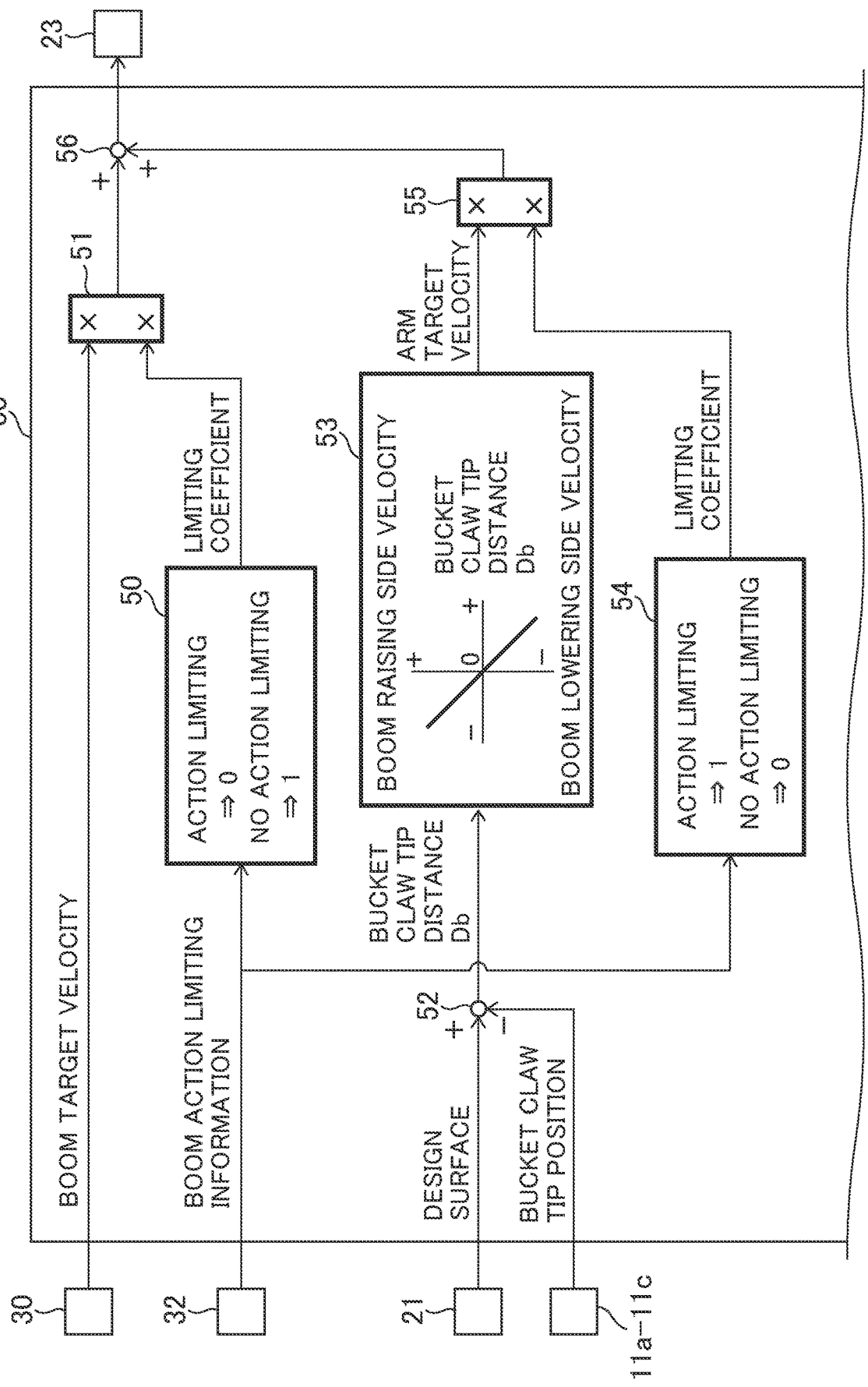
FIG. 5 is a diagram depicting computing logic, which is associated with an action of a boom cylinder, of a semiautomatic control section depicted in FIG. 2.

FIG. 5 is a diagram depicting computing logic, which is associated with an action of the boom cylinder 5a, of the semiautomatic control section 33.

As depicted in FIG. 5, the semiautomatic control section 33 has a limiting coefficient determination section 50, a multiplication section 51, a deviation computing section 52, a boom target velocity determination section 53, a limiting coefficient determination section 54, a multiplication section 55, and an addition section 56.

The limiting coefficient determination section 50 determines a limiting coefficient on the basis of boom action limiting information outputted from the boom action limiting determination section 43, and outputs the limiting coefficient to the multiplication section 51. Specifically, the limiting coefficient determination section 50 outputs 0 in a case of imposing boom action limitations, and outputs 1 in a case of not imposing boom action limitations.

The multiplication section 51 multiplies a boom target velocity (contained in the action command) input from the action command section 30 by the limiting coefficient input from the limiting coefficient determination section 50, and outputs a multiplication result to the addition section 56.

The deviation computing section 52 computes the bucket claw tip distance Db that is the deviation between the design surface (contained in the work execution target information) input from the 21 and the bucket claw tip position (contained in the work implement posture/position information) input from the work implement posture/position measurement device 11a to 11c, and outputs the bucket claw tip distance Db to the boom target velocity determination section 53.

The boom target velocity determination section 53 outputs a boom lowering side boom target velocity to the multiplication section 55 if the bucket claw tip distance Db input from the deviation computing section 52 is positive (the bucket claw tip is above the design surface), and outputs a boom raising side boom target velocity to the multiplication section 55 if the bucket claw tip distance Db is negative (the bucket claw tip is below the design surface).

The limiting coefficient determination section 54 determines a limiting coefficient on the basis of the boom action limiting information input from the actuator action limiting determination section 32, and outputs the limiting coefficient to the multiplication section 55. Specifically, the limiting coefficient determination section 54 outputs 1 in the case of imposing the boom action limitations, and outputs 0 in the case of not imposing the boom action limitations.

The multiplication section 55 multiplies the boom target velocity input from the boom target velocity determination section 53 by the limiting coefficient input from the limiting coefficient determination section 54, and outputs a multiplication result to the addition section 56.

The addition section 56 adds up an outputted from the multiplication section 51 and an outputted from the multiplication section 55, and outputs an addition result to the hydraulic system.

FIG. 6 is a diagram depicting computing logic, which is associated with an action of the arm cylinder 6a, of the semiautomatic control section 33.

As depicted in FIG. 6, the semiautomatic control section 33 has a limiting coefficient determination section 60, a multiplication section 61, a deviation computing section 62, an arm target velocity determination section 63, a limiting coefficient determination section 64, a multiplication section 65, and an addition section 55. Since the computing logic associated with the action of the arm cylinder 6a depicted in FIG. 6 is similar to the computing logic associated with the action of the boom cylinder 5a depicted in FIG. 5, description of the computing logic associated with the action of the arm cylinder 6a will be omitted.

Actions of the front work implement 110 realized by the controller 20 configured as described above will be described with reference to FIG. 7.

FIG. 7(a) depicts an action in a case in which the arm 6 is a work member (excavation work member) in charge of excavation, an arm operation is performed, and a boom operation is not performed. In FIG. 7(a), the controller 20 drives the arm 6 in response to a lever operation (without limiting the action of the arm 6), and drives the boom 5 in a boom raising direction in such a manner that the bucket claw tip moves along the design surface.

FIG. 7(b) depicts an action in a case in which the arm 6 is the excavation work member, the arm operation is not performed, and the boom operation is performed. In FIG. 7(b), the controller 20 drives the boom 5 in response to a lever operation (without limiting the action of the boom 5) in a case in which a boom raising operation is performed, and limits a boom lowering action in a case in which a boom lowering operation is performed and the bucket claw tip distance Db is equal to or smaller than the predetermined distance threshold Dt (the bucket claw tip is near the design surface).

FIG. 7(c) depicts an action in a case in which the boom 5 is the excavation work member, the arm operation is not performed, and the boom operation is performed. In FIG. 7(c), the controller 20 drives the boom 5 in response to a lever operation (without limiting the action of the boom 5), and drives the arm 6 in an arm crowding direction or an arm dumping direction in such a manner that the bucket claw tip moves along the design surface.

FIG. 7(d) depicts an action in a case in which the boom 5 is the excavation work member, the arm operation is performed, and the boom operation is not performed. In FIG. 7(d), the controller 20 drives the arm 6 to an arm crowding side in response to a lever operation (without limiting the action of the arm 6) in a case in which an arm crowding operation is performed, and limits an arm dumping action in a case in which an arm dumping operation is performed and the bucket claw tip distance Db is equal to or smaller than the predetermined distance threshold Dt (the bucket claw tip is near the design surface).

In Embodiment 1, a work machine 100 includes: a multijoint work implement 110 that has a work tool 7 and a plurality of work members 5 and 6; a plurality of actuators 5a, 6a, and 7a that drive the work implement 110; an operation device 15L and 15R for operating the work implement 110; a controller 20 that controls the work implement 110 to be actuated in response to operation signals outputted from the operation device 15L and 15R; a work execution target setting device 21 for setting a design surface indicating a target shape of an object to be worked; and a work implement posture/position measurement device 11a to 11c that measures a posture of the work implement 110 and a position of the work tool 7, the controller 20 determining target velocities of the plurality of actuators 5a, 6a, and 7a on the basis of the operation signals outputted from the operation device 15L and 15R, and correcting the target velocities on the basis of the design surface set by the work execution target setting device 21 and the posture of the work tool. The controller 20 determines an excavation actuator in charge of an excavation action and an alignment actuator in charge of an alignment action for the work tool 7 out of the plurality of actuators 5a, 6a, and 7a on the basis of the design surface set by the work execution target setting device 21 and the posture of the work implement 110 measured by the work implement posture/position measurement device 11a to 11c, determines a target velocity of the excavation actuator on the basis of the operation signals outputted from the operation device 15L and 15R, and limits a target velocity of the alignment actuator in a direction in which the work tool 7 approaches the design surface.

According to Embodiment 1 configured as described so far, the excavation actuator in charge of an excavation action and the alignment actuator in charge of an alignment action for the work tool 7 are determined out of the plurality of actuators 5a, 6a, and 7a on the basis of the design surface indicating the target shape of the object to be worked and the posture of the work implement 110, the target velocity of the excavation actuator is determined on the basis of the operation signals outputted from the operation device 15L and 15R, and the target velocity of the alignment actuator is limited in the direction in which the work tool 7 approaches the design surface. It is thereby possible to assist in an operator's operation to allow the work tool to move along the design surface irrespectively of the angle of the design surface and the posture of the work implement 110.

Embodiment 2

Embodiment 2 of the present invention will be described while mainly referring to differences from Embodiment 1.

Figure 8:
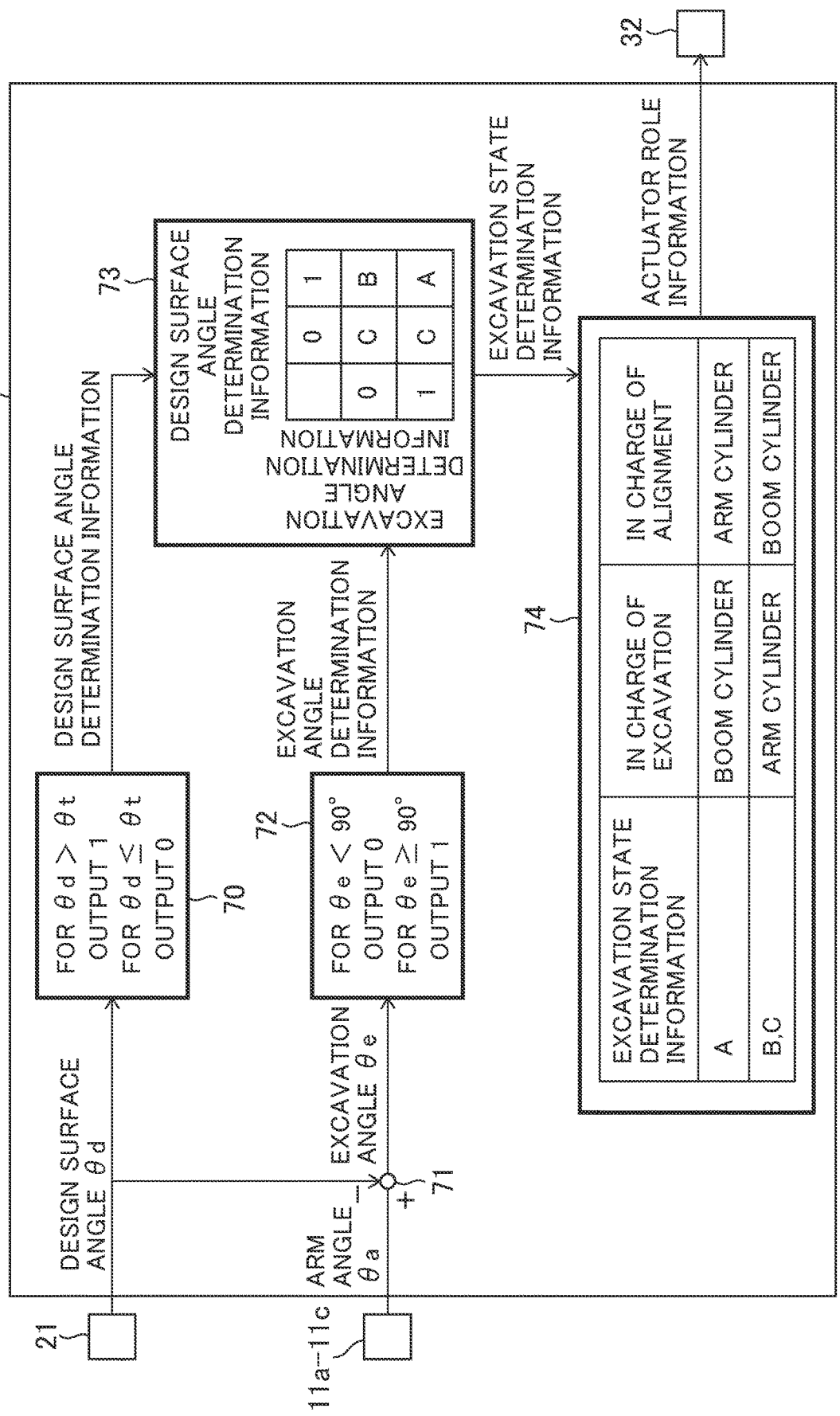
FIG. 8 is a diagram depicting computing logic of an actuator role determination section according to Embodiment 2 of the present invention.

FIG. 8 is a diagram depicting computing logic of the actuator role determination section 31.

In FIG. 8, the actuator role determination section 31 has a design surface angle determination section 70, an excavation angle computing section 71, an excavation angle determination section 72, an excavation state determination section 73, and an actuator role determination section 74.

The design surface angle determination section 70 determines a magnitude of a design surface angle θd (contained in the work execution target information) input from the work execution target setting device 21 on the basis of the design surface angle θd, and outputs a result of determination to the excavation state determination section 73 as design surface angle determination information. Specifically, the design surface angle determination section 70 outputs 1 in a case in which the design surface angle θd is greater than a predetermined angle threshold θt (for example, 70 degrees) (an inclination of the design surface is sharp), and outputs 0 in a case in which the design surface angle θd is equal to or smaller than the predetermined angle threshold θt (the inclination of the design surface is not sharp).

The design surface angle θd (contained in the work execution target information) is input to the excavation angle computing section 71 from the work execution target setting device 21, and an arm angle θa (contained in the work implement posture/position information) is input thereto from the work implement posture/position measurement device 11a to 11c. The excavation angle computing section 71 computes an excavation angle θe that is a deviation between the design surface angle θd and the arm angle θa, and outputs the excavation angle θe to the excavation angle determination section 72. It is noted herein that the excavation angle θa is an angle of a line, which connects a rotation fulcrum of the arm 6 to the bucket claw tip, with respect to the design surface.

The excavation angle determination section 72 determines a magnitude of the excavation angle θe input from the excavation angle computing section 71 with respect to the design surface on the basis of the excavation angle θe, and outputs a result of determination to the excavation state determination section 73 as excavation angle determination information. Specifically, the excavation angle determination section 72 outputs 0 in a case in which the excavation angle θe is smaller than 90 degrees, and outputs 1 in a case in which the excavation angle θe is equal to or greater than 90 degrees.

The excavation state determination section 73 determines an excavation state on the basis of the design surface angle determination information input from the design surface angle determination section 70 and the excavation angle determination information input from the excavation angle determination section 72, and outputs a result of determination to the actuator role determination section 74 as excavation state determination information. Specifically, the excavation state determination section 73 outputs A in a case in which the design surface angle determination information is 1 and the excavation angle determination information is 1, outputs B in a case in which the design surface angle determination information is 1 and the excavation angle determination information is 0, and outputs C in a case in which the design surface inclination information is 0.

The actuator role determination section 74 determines roles of the arm cylinder 6a and the boom cylinder 5a on the basis of the excavation state determination information input from the excavation state determination section 73, and outputs a result of determination to the actuator action limiting determination section 32 as actuator role information. Specifically, the actuator role determination section 74 determines the boom cylinder 5a as the excavation actuator and determines the arm cylinder 6a as the alignment actuator in a case in which the excavation state determination information is A. On the other hand, the actuator role determination section 74 determines the arm cylinder 6a as the excavation actuator and determines the boom cylinder 5a as the alignment actuator in a case in which the excavation state determination information is B or C.

Actions of the front work implement 110 realized by the controller 20 configured as described above will be described with reference to FIG. 9.

FIG. 9(a) depicts an action in a case in which the design surface angle θd is 0 degree, the arm crowding operation is performed, the boom operation is not performed, and the excavation angle θe is smaller than 90 degrees. In FIG. 9(a), the controller 20 determines the arm cylinder 6a as the excavation actuator and determines the boom cylinder 5a as the alignment actuator. The arm 6 is thereby driven in an arm crowding direction in response to a lever operation (without limiting the action of the arm cylinder 6a), and the boom 5 is thereby automatically driven in a boom raising direction in such a manner that the bucket claw tip moves along the design surface.

FIG. 9(b) depicts an action in a case in which the design surface angle θd is 0 degree, the arm crowding operation is performed, the boom operation is not performed, and the excavation angle θe is greater than 90 degrees. In FIG. 9(b), the controller 20 determines the arm cylinder 6a as the excavation actuator and determines the boom cylinder 5a as the alignment actuator. The arm 6 is thereby driven in the arm crowding direction in response to a lever operation (without limiting the action of the arm 6), and the boom 5 is thereby automatically driven in a boom lowering direction in such a manner that the bucket claw tip moves along the design surface.

FIG. 9(c) depicts an action in a case in which the design surface angle θd is 90 degrees, the arm crowding operation is performed, the boom operation is not performed, and the excavation angle θe is smaller than 90 degrees. In FIG. 9(c), the controller 20 determines the arm cylinder 6a as the excavation actuator and determines the boom cylinder 5a as the alignment actuator. The arm 6 is thereby driven in the arm crowding direction in response to a lever operation (without limiting the action of the arm 6), and the boom 5 is thereby automatically driven in the boom raising direction in such a manner that the bucket claw tip moves along the design surface.

FIG. 9(d) depicts an action in a case in which the design surface angle θd is 90 degrees, the arm operation is not performed, the boom lowering operation is performed, and the excavation angle θe is greater than 90 degrees. In FIG. 9(d), the controller 20 determines the boom cylinder 5a as the excavation actuator and determines the arm cylinder 6a as the alignment actuator. The boom 5 is thereby driven in the boom lowering direction in response to a lever operation (without limiting the action of the boom 5), and the arm 6 is thereby automatically driven in the arm crowding direction in such a manner that the bucket claw tip moves along the design surface.

FIG. 9(e) depicts an action in a case in which the design surface angle θd is 90 degrees, the arm operation is not performed, the boom lowering operation is performed, and the excavation angle θe is greater than 90 degrees. In FIG. 9(e), the controller 20 determines the boom cylinder 5a as the excavation actuator and determines the arm cylinder 6a as the alignment actuator. The boom 5 is thereby driven in the boom lowering direction in response to a lever operation (without limiting the action of the boom 5), and the arm 6 is thereby automatically driven in the arm dumping direction in such a manner that the bucket claw tip moves along the design surface.

In the present embodiment, the controller 20 determines the arm cylinder 6a as the excavation actuator and determines the boom cylinder 5a as the alignment actuator in a case in which a design surface angle θd that is an angle of the design surface with respect to a horizontal surface is equal to or smaller than a predetermined angle threshold θt set between 0 degree and 90 degrees, or in a case in which an excavation angle θe that is an angle of a line, which connects a rotation fulcrum of the arm 6 to a claw tip of the bucket 7, with respect to the design surface is smaller than 90 degrees, and determines the boom cylinder 5a as the excavation actuator and determines the arm cylinder 6a as the alignment actuator in a case in which the design surface angle θd is greater than the predetermined angle threshold θt and the excavation angle θe is equal to or greater than 90 degrees.

According to the present embodiment configured as described so far, the hydraulic excavator 100 including the front work implement 110 that has the boom 5 and the arm 6 can assist in an excavation action in accordance with an operator's intention irrespectively of the angle of the design surface and the posture of the front work implement 110.

Embodiment 3

Embodiment 3 of the present invention will be described while mainly referring to differences from Embodiment 1.

Figure 10:
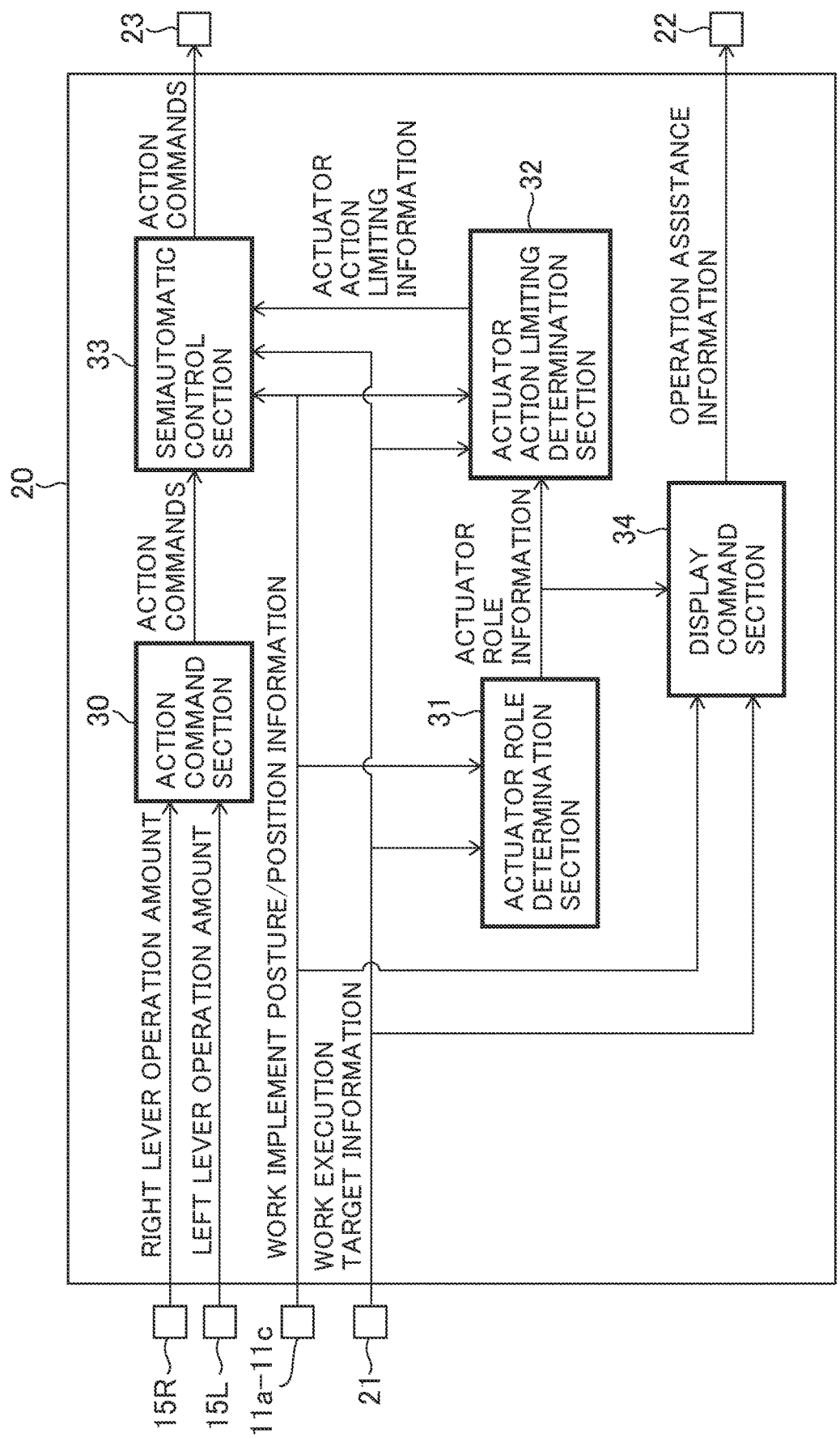
FIG. 10 is a functional block diagram of a controller according to Embodiment 3 of the present invention.

FIG. 10 is a functional block diagram of the 1controller 20 according to Embodiment 3.

In FIG. 10, the controller 20 further has a display command section 34. The display command section 34 generates information for assisting in an operator's excavation operation (operation assistance information) on the basis of the work implement posture/position information input from the work implement posture/position measurement device 11a to 11c, the work execution target information input from the work execution target setting device 21, and the actuator role information input from the actuator role determination section 31, and outputs the operation assistance information to the display device 22.

FIG. 11 is a diagram depicting examples of the operation assistance information displayed on the display device 22.

In FIG. 11, a work member to be operated by the operator at a time of making an excavation action and an operation direction of the work member are displayed on the display device 22.

Figure 11B:
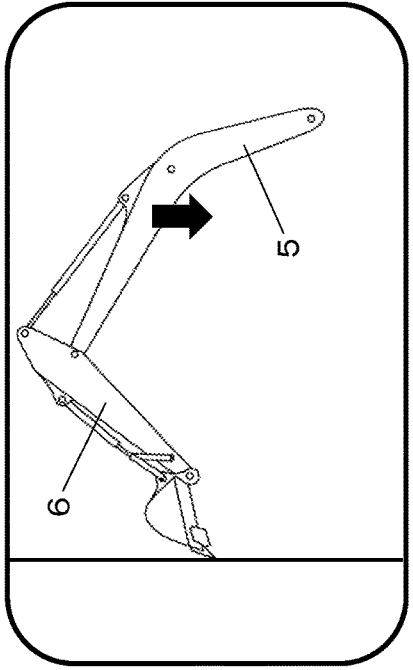
FIG. 11 is a diagram depicting examples of operation assistance information displayed on a display device according to Embodiment 3 of the present invention.
Figure 11D:
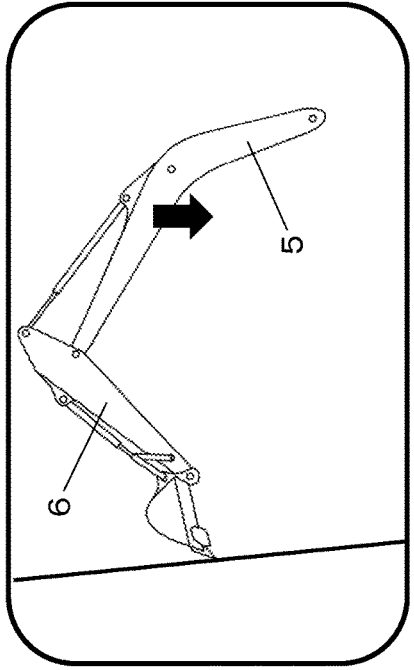
Figure 11A:
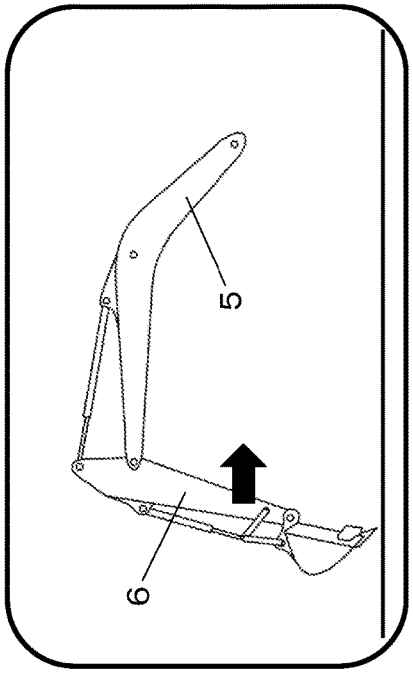

FIG. 11(a) depicts an example of display in a case in which the design surface angle θd is 0 degree and the excavation angle θe is smaller than 90 degrees. In FIG. 11(a), the controller 20 determines the arm cylinder 6a as the excavation actuator, determines the boom cylinder 5a as the alignment actuator, and issues an instruction to operate the arm 6 in the arm crowding direction (arrow direction).

FIG. 11(b) depicts an example of display in a case in which the design surface angle θd is 90 degrees and the excavation angle θe is greater than 90 degrees. In FIG. 11(b), the controller 20 determines the boom cylinder 5a as the excavation actuator, determines the arm cylinder 6a as the alignment actuator, and issues an instruction to operate the boom 5 in the boom lowering direction (arrow direction).

Figure 11C:
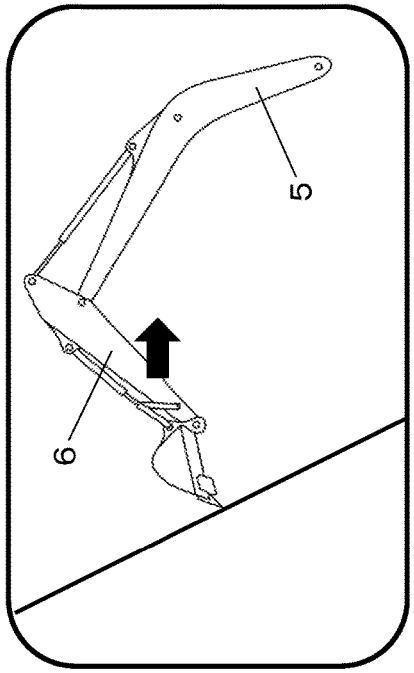

FIG. 11(c) depicts an example of display in a case in which the design surface angle θd is slightly smaller than the predetermined angle threshold θt (for example, 70 degrees) and the excavation angle θe is greater than 90 degrees. In FIG. 11(c), the controller 20 determines the arm cylinder 6a as the excavation actuator, determines the boom cylinder 5a as the alignment actuator, and issues an instruction to operate the arm 6 in the arm crowding direction (arrow direction).

FIG. 11(d) depicts an example of display in a case in which the design surface angle θd is slightly greater than the predetermined angle threshold θt (for example, 70 degrees) and the excavation angle θe is greater than 90 degrees. In FIG. 11(d), the controller 20 determines the boom cylinder 5a as the excavation actuator, determines the arm cylinder 6a as the alignment actuator, and issues an instruction to operate the boom 5 in the boom lowering direction (arrow direction).

In the present embodiment, the controller 20 generates information about instruction for a work member to be driven by the excavation actuator out of the plurality of work members 5 and 6 and an operation direction for the work member, and outputs the generated information as well as information about the design surface and posture information about the work implement 110 to the display device 22. The operator of the hydraulic excavator 100 can thereby easily grasp which work member out of the plurality of work members 5 and 6 is to be operated at the time of conducting the excavation work.

While the embodiments of the present invention have been described in detail, the present invention is not limited to the embodiments and encompasses various modifications. For example, the embodiments have been described in detail for describing the present invention so that the invention is easy to understand, and the present invention is not always limited to the embodiments having all the configurations described above. Moreover, part of the configurations of the other embodiment can be added to the configurations of a certain embodiment, and part of the configurations of the certain embodiment can be deleted or can be replaced by part of the configurations of the other embodiment.

DESCRIPTION OF REFERENCE CHARACTERS

1: Travel structure
2: Swing structure
3: Counterweight
4: Cabin
5: Boom (work member)
5a: Boom cylinder (actuator)
6: Arm (work member)
6a: Arm cylinder (actuator)
7: Bucket (work tool)
7a: Bucket cylinder (actuator)
8: Swing device
8a: Swing motor (actuator)
9: Pump device
10: Control valve unit
11a: Angle sensor (work implement posture/position measurement device)
11b: Angle sensor (work implement posture/position measurement device)
11c: Angle sensor (work implement posture/position measurement device)
15L: Operation lever device (operation device)
15R: Operation lever device (operation device)
20: Controller
21: Work execution target setting device
22: Display device
23: Hydraulic system
30: Action command section
31: Actuator role determination section
32: Actuator action limiting determination section
33: Semiautomatic control section
41: Deviation computing section
42: Time differentiation section
43: Boom action limiting determination section
44: Arm action limiting determination section
50: Limiting coefficient determination section
51: Multiplication section
52: Deviation computing section
53: Boom target velocity determination section
54: Limiting coefficient determination section
55: Multiplication section
56: Addition section
60: Limiting coefficient determination section
61: Multiplication section
62: Deviation computing section
63: Arm target velocity determination section
64: Limiting coefficient determination section
65: Multiplication section
66: Addition section
70: Design surface angle determination section
72: Excavation angle determination section
73: Excavation state determination section
74: Actuator role determination section
100: Hydraulic excavator (work machine)
110: Front work implement (work implement)
200: Hydraulic control system

The invention claimed is:

1. A work machine comprising:
a multijoint work implement that has a work tool and a plurality of work members;
a plurality of actuators that drive the work implement;
an operation device for operating the work implement;
a controller that controls the work implement to be actuated in response to operation signals outputted from the operation device;
a work execution target setting device for setting a design surface indicating a target shape of an object to be worked; and
a work implement posture/position measurement device that measures a posture of the work implement and a position of the work tool,
the controller determining target velocities of the plurality of actuators on a basis of the operation signals outputted from the operation device, and correcting the target velocities on a basis of the design surface set by the work execution target setting device and the position of the work tool measured by the work implement posture/position measurement device, wherein
the work tool is a bucket,
the plurality of work members include a boom and an arm,
the plurality of actuators include a boom cylinder that drives the boom and an arm cylinder that drives the arm, and
the controller is configured to
determine the arm cylinder as an excavation actuator in charge of an excavation action and determine the boom cylinder as an alignment actuator in charge of an alignment action for the bucket in a case in which a design surface angle that is an angle of the design surface with respect to a horizontal surface is equal to or smaller than a predetermined angle threshold set between 0 degree and 90 degrees, or in a case in which an excavation angle that is an angle of a line connecting a rotation fulcrum of the arm to a claw tip of the bucket, with respect to the design surface is smaller than 90 degrees,
determine the boom cylinder as the excavation actuator and determine the arm cylinder as the alignment actuator in a case in which the design surface angle is greater than the predetermined angle threshold and the excavation angle is equal to or greater than 90 degrees,
determine a target velocity of the excavation actuator on the basis of the operation signals outputted from the operation device, and
limit a target velocity of the alignment actuator in a direction in which the work tool approaches the design surface.

2. The work machine according to claim 1, further comprising:
a display device, wherein
the controller is configured to generate information about instruction for a work member to be driven by the excavation actuator out of the plurality of work members and an operation direction for the work member, and output the generated information as well as information about the design surface and posture information about the work implement to the display device.

3. The work machine according to claim 1, wherein the operation device includes a plurality of lever devices for operating the work implement.

4. The work machine according to claim 1, wherein the operation device includes a plurality of lever devices for operating the work implement.

* * * * *